US009348095B2

(12) United States Patent
Zimmel

(10) Patent No.: US 9,348,095 B2
(45) Date of Patent: May 24, 2016

(54) CABLE AND DUAL INNER DIAMETER FERRULE DEVICE WITH SMOOTH INTERNAL CONTOURS AND METHOD

(71) Applicant: ADC TELECOMMUNICATIONS, INC., Berwyn, PA (US)

(72) Inventor: Steven C. Zimmel, Minneapolis, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 0 days.

(21) Appl. No.: 14/642,210

(22) Filed: Mar. 9, 2015

(65) Prior Publication Data
US 2015/0253515 A1 Sep. 10, 2015

Related U.S. Application Data

(63) Continuation of application No. 13/648,580, filed on Oct. 10, 2012, now Pat. No. 8,989,541.

(60) Provisional application No. 61/545,444, filed on Oct. 10, 2011.

(51) Int. Cl.
*G02B 6/44* (2006.01)
*G02B 6/38* (2006.01)

(52) U.S. Cl.
CPC ............ *G02B 6/3861* (2013.01); *G02B 6/3837* (2013.01); *G02B 6/3838* (2013.01); *G02B 6/3869* (2013.01)

(58) Field of Classification Search
CPC .. G02B 6/4471; G02B 6/4459; G02B 6/3837; G02B 6/3838; G02B 6/3869; G02B 6/3861
USPC .......................... 385/100–109, 135–139, 141
See application file for complete search history.

(56) References Cited

U.S. PATENT DOCUMENTS

| 4,705,352 A | 11/1987 | Margolin et al. |
| 4,718,745 A | 1/1988 | Strait, Jr. |

(Continued)

FOREIGN PATENT DOCUMENTS

| JP | 60-149015 | 8/1985 |
| JP | 61-221712 | 10/1986 |

(Continued)

OTHER PUBLICATIONS

Exhibit I—Fig. 8 from U.S. Appl. No. 11/497,175, admitted as prior art as of Aug. 1, 2006.

(Continued)

*Primary Examiner* — Akm Enayet Ullah
(74) *Attorney, Agent, or Firm* — Merchant & Gould P.C.

(57) ABSTRACT

A fiber optic ferrule includes a body extending from a first end to a second opposite end, with the body including an axial passage extending between the first and the second ends. The axial passage includes a first diameter portion having a diameter of at least 125 microns, a second diameter portion having a diameter of at least 250 microns and less than a diameter of a buffer, and a smooth and continuous transition between the first and the second diameter portions. The second diameter portion is positioned between the first diameter portion and the second end. The axial passage further defines a tapered shape at the second end extending inward from the second end toward the second diameter portion. In certain embodiments, another smooth and continuous transition can be provided between the taper shape and the second diameter portion. In certain embodiments, the axial passage is smooth and continuous between the first and the second ends of the body. A hub holds the ferrule. A method of assembling a terminated fiber optic cable is also provided.

20 Claims, 16 Drawing Sheets

FIG. 7

(56) References Cited

U.S. PATENT DOCUMENTS

| | | |
|---|---|---|
| 4,931,120 A | 6/1990 | Christoff |
| 4,994,134 A | 2/1991 | Knecht et al. |
| 5,152,816 A | 10/1992 | Berkey |
| 5,181,268 A | 1/1993 | Chien |
| 5,185,838 A | 2/1993 | Lüottgert et al. |
| 5,216,734 A | 6/1993 | Grinderslev |
| 5,241,613 A | 8/1993 | Li et al. |
| 5,381,500 A | 1/1995 | Edwards et al. |
| 5,390,270 A | 2/1995 | Hanzawa et al. |
| 5,396,572 A * | 3/1995 | Bradley ............... G02B 6/3887 385/60 |
| 5,408,558 A | 4/1995 | Fan |
| 5,615,291 A | 3/1997 | Hayakawa et al. |
| 5,751,875 A | 5/1998 | Edwards et al. |
| 5,862,280 A | 1/1999 | Tanaka et al. |
| 5,883,995 A | 3/1999 | Lu |
| 5,989,106 A | 11/1999 | Tanaka et al. |
| 6,026,210 A * | 2/2000 | Berglund ............ G02B 6/3821 385/137 |
| 6,264,375 B1 * | 7/2001 | Ohtsuka ............... G02B 6/3885 264/1.25 |
| 6,281,476 B1 | 8/2001 | Voizey |
| 6,629,782 B2 | 10/2003 | McPhee et al. |
| 6,648,521 B2 | 11/2003 | Roehrs et al. |
| 6,779,931 B2 | 8/2004 | Murata et al. |
| 6,869,228 B2 | 3/2005 | Ishii et al. |
| 6,877,910 B2 | 4/2005 | Takahashi et al. |
| 6,883,976 B2 | 4/2005 | Sato |
| 6,916,120 B2 | 7/2005 | Zimmel et al. |
| 7,121,733 B2 | 10/2006 | Hengelmolen et al. |
| 7,221,834 B2 | 5/2007 | Nakatate et al. |
| 7,341,383 B2 | 3/2008 | Droege et al. |
| 7,435,012 B1 | 10/2008 | Beldycki |
| 7,452,137 B2 | 11/2008 | Droege et al. |
| 7,756,370 B2 | 7/2010 | Hayasaka |
| 8,989,541 B2 | 3/2015 | Zimmel |
| 2002/0067894 A1 | 6/2002 | Scanzillo |
| 2002/0186934 A1 | 12/2002 | Hug et al. |
| 2003/0128964 A1 * | 7/2003 | Sommer ............... B24B 19/226 385/147 |
| 2004/0161205 A1 | 8/2004 | Hengelmolen et al. |
| 2005/0232553 A1 | 10/2005 | Holmquist |
| 2006/0269192 A1 | 11/2006 | Hayasaka |
| 2008/0031573 A1 * | 2/2008 | Droege ................. G02B 6/3834 385/78 |
| 2008/0107383 A1 | 5/2008 | Droege et al. |
| 2009/0067789 A1 | 3/2009 | Droege et al. |
| 2010/0101699 A1 | 4/2010 | Hayasaka |
| 2011/0103748 A1 * | 5/2011 | Ott ......................... G02B 6/3835 385/78 |
| 2012/0045177 A1 | 2/2012 | Droege et al. |
| 2012/0257859 A1 * | 10/2012 | Nhep ..................... G02B 6/381 385/81 |
| 2012/0315001 A1 * | 12/2012 | Beck ............................... 385/78 |
| 2012/0321257 A1 * | 12/2012 | Lu ......................... G02B 6/3861 385/84 |
| 2013/0089294 A1 * | 4/2013 | Zimmel ................. G02B 6/3861 385/80 |
| 2015/0362681 A1 * | 12/2015 | Watte .................... G02B 6/3866 385/58 |

FOREIGN PATENT DOCUMENTS

| | | |
|---|---|---|
| JP | 63-96513 | 6/1988 |
| JP | 64-6609 | 1/1989 |
| JP | 7-174937 | 7/1995 |
| JP | 10-307233 | 11/1998 |
| JP | 2000-47057 | 2/2000 |
| JP | 2000-147320 | 5/2000 |
| JP | 2001-4875 | 1/2001 |
| JP | 2003-66273 | 3/2003 |
| JP | 2003-121692 | 4/2003 |
| JP | 2003-307649 | 10/2003 |
| JP | 2004-191915 | 7/2004 |
| JP | 2005-159599 | 5/2005 |
| JP | 2005-189805 | 7/2005 |
| JP | 3723566 B2 | 12/2005 |
| JP | 2006-337520 | 12/2006 |
| JP | 2010-78695 | 4/2010 |

OTHER PUBLICATIONS

Office Action cited in U.S. Appl. No. 11/497,175 mailed Apr. 30, 2007.
Office Action cited in U.S. Appl. No. 12/271,335 mailed Mar. 4, 2010.
Office Action cited in U.S. Appl. No. 12/271,335 mailed Nov. 24, 2010.
Office Action cited in U.S. Appl. No. 13/114,721 mailed Jan. 18, 2012.
Office Action cited in U.S. Appl. No. 13/114,721 mailed Jun. 4, 2012.
Advisory Action for U.S. Appl. No. 13/114,721 mailed Aug. 15, 2012.
Office Action cited in U.S. Appl. No. 13/114,721 mailed Sep. 19, 2012.
Office Action for U.S. Appl. No. 13/114,721 mailed Dec. 19, 2012.
Office Action for U.S. Appl. No. 13/114,721 mailed May 14, 2013.
Office Action for U.S. Appl. No. 13/114,721 mailed Sep. 18, 2013.
Final Office Action for U.S. Appl. No. 13/114,721 mailed Jan. 31, 2014.
Final Office Action for U.S. Appl. No. 13/114,721 mailed May 22, 2014.
Office Action for U.S. Appl. No. 13/114,721 mailed Nov. 26, 2014.
Office Action for U.S. Appl. No. 13/114,721 mailed Mar. 18, 2015.
Office Action in U.S. Appl. No. 13/114,721 mailed Nov. 24, 2015; 13 pp.

* cited by examiner

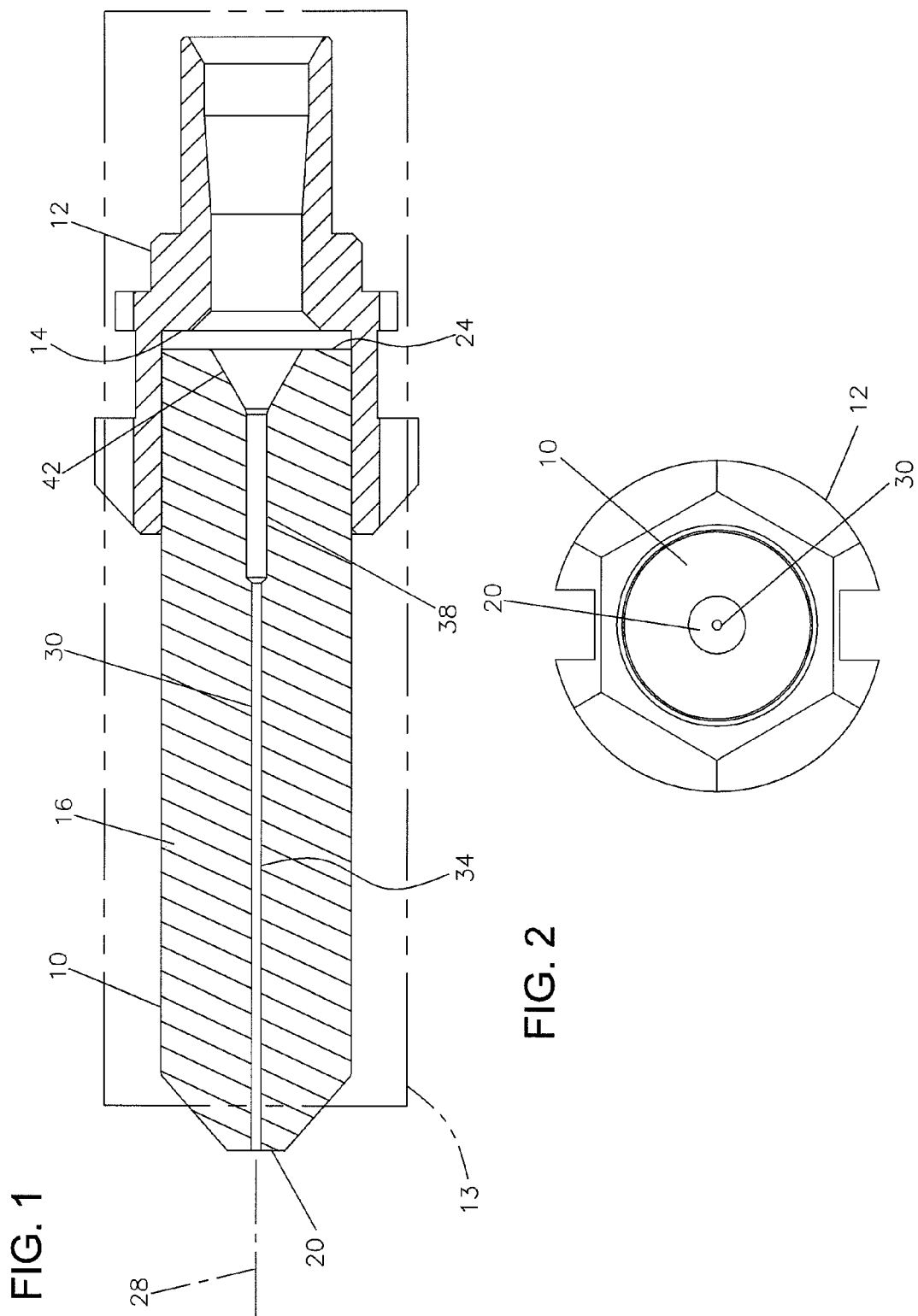

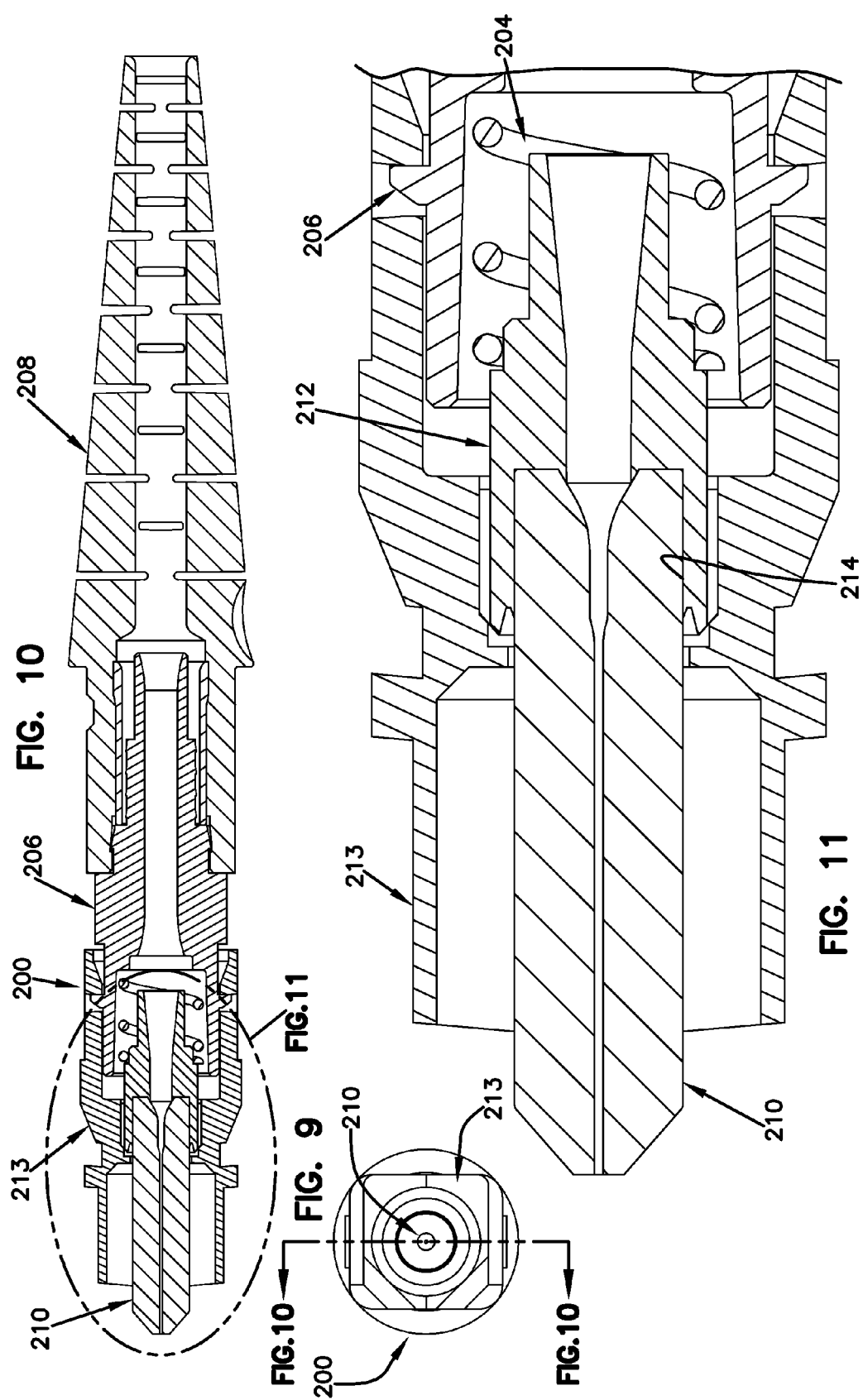

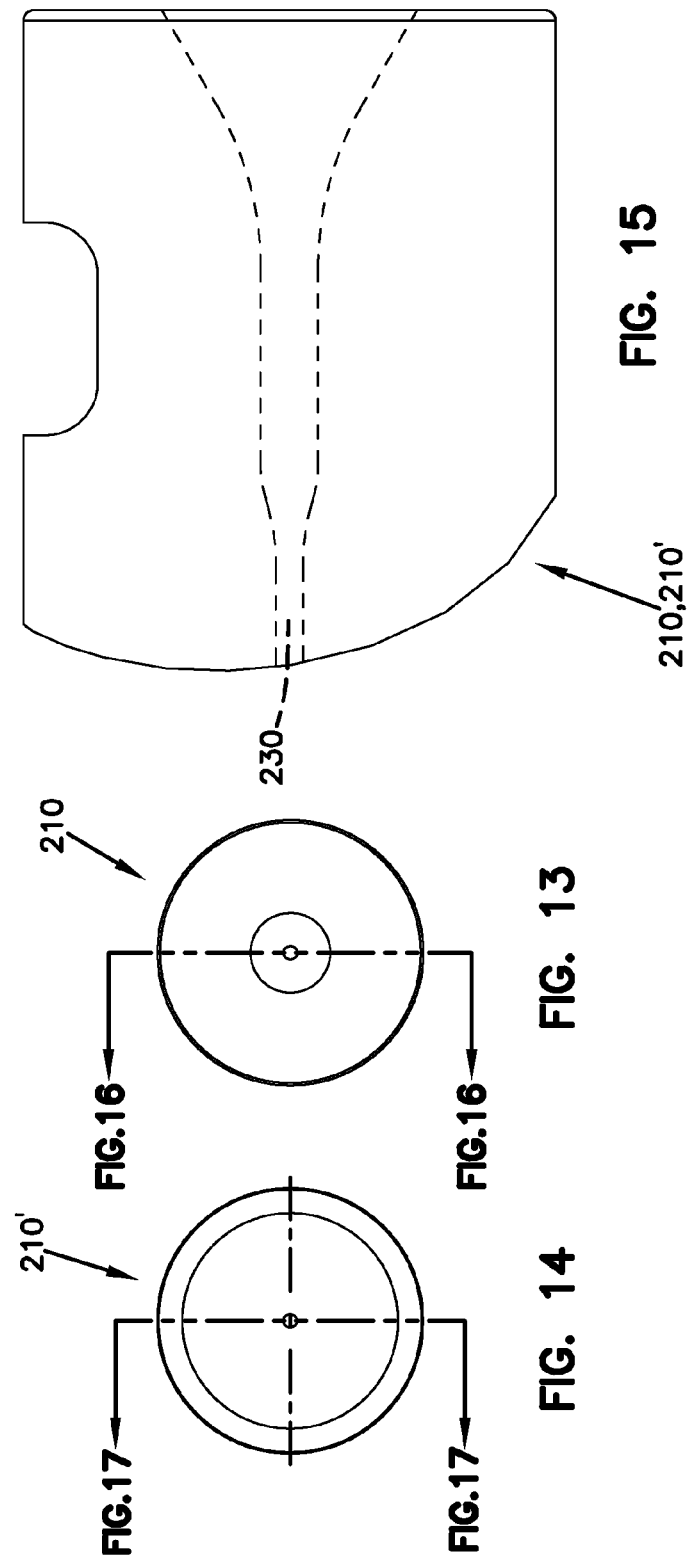

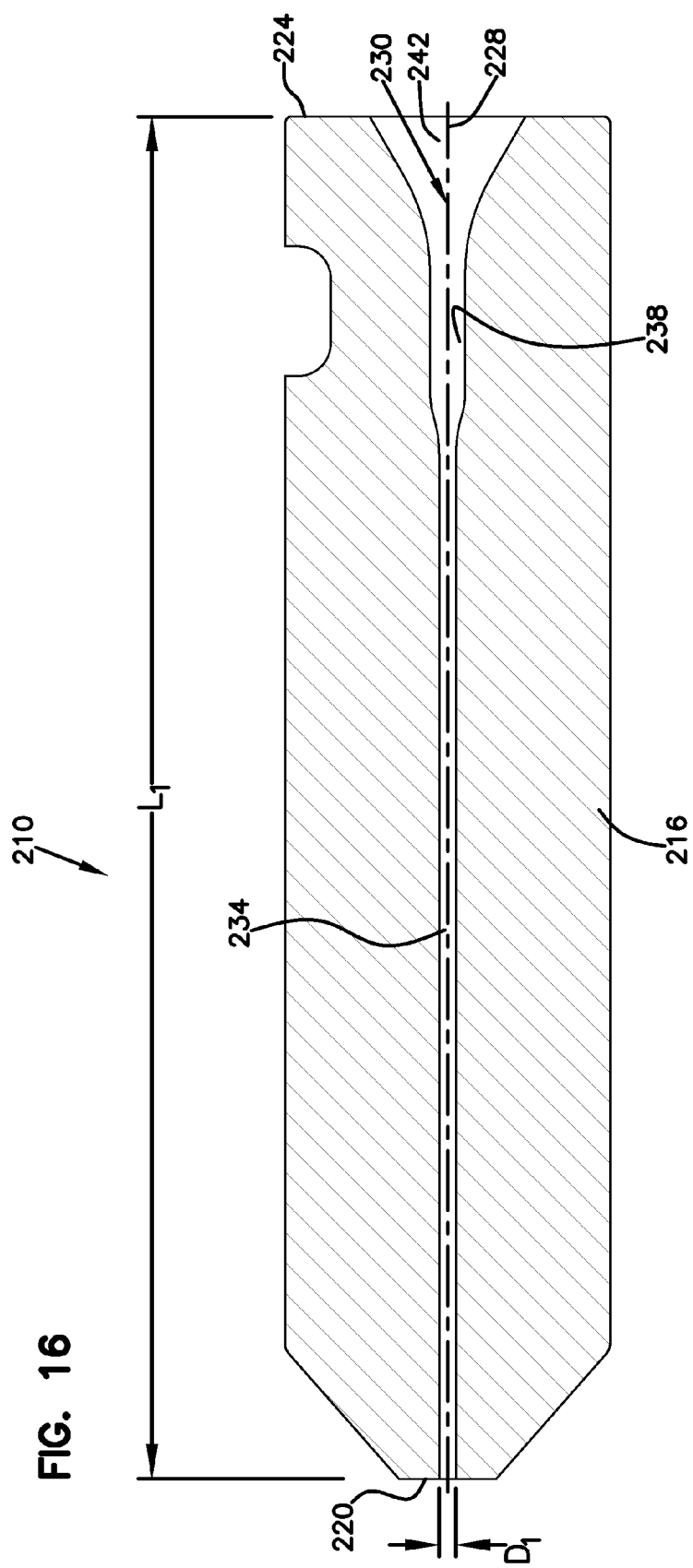

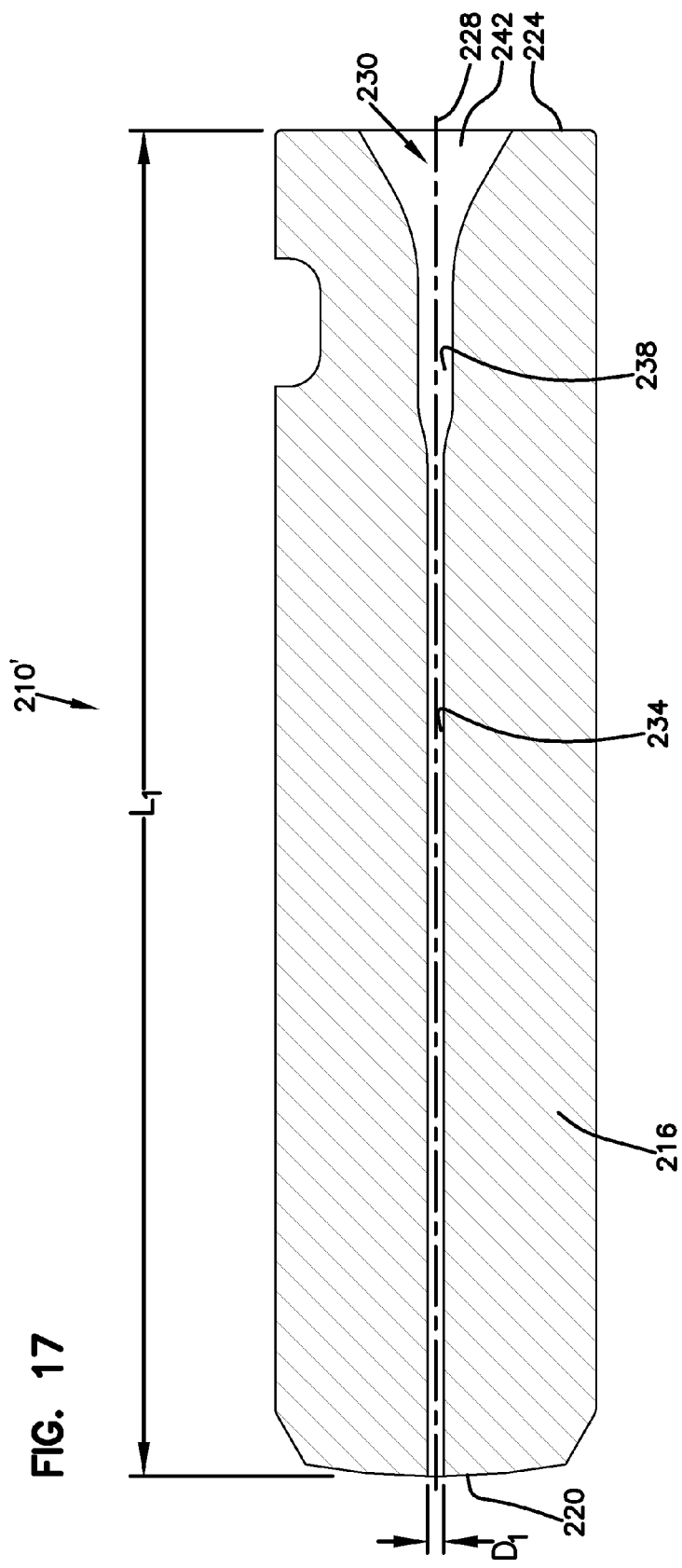

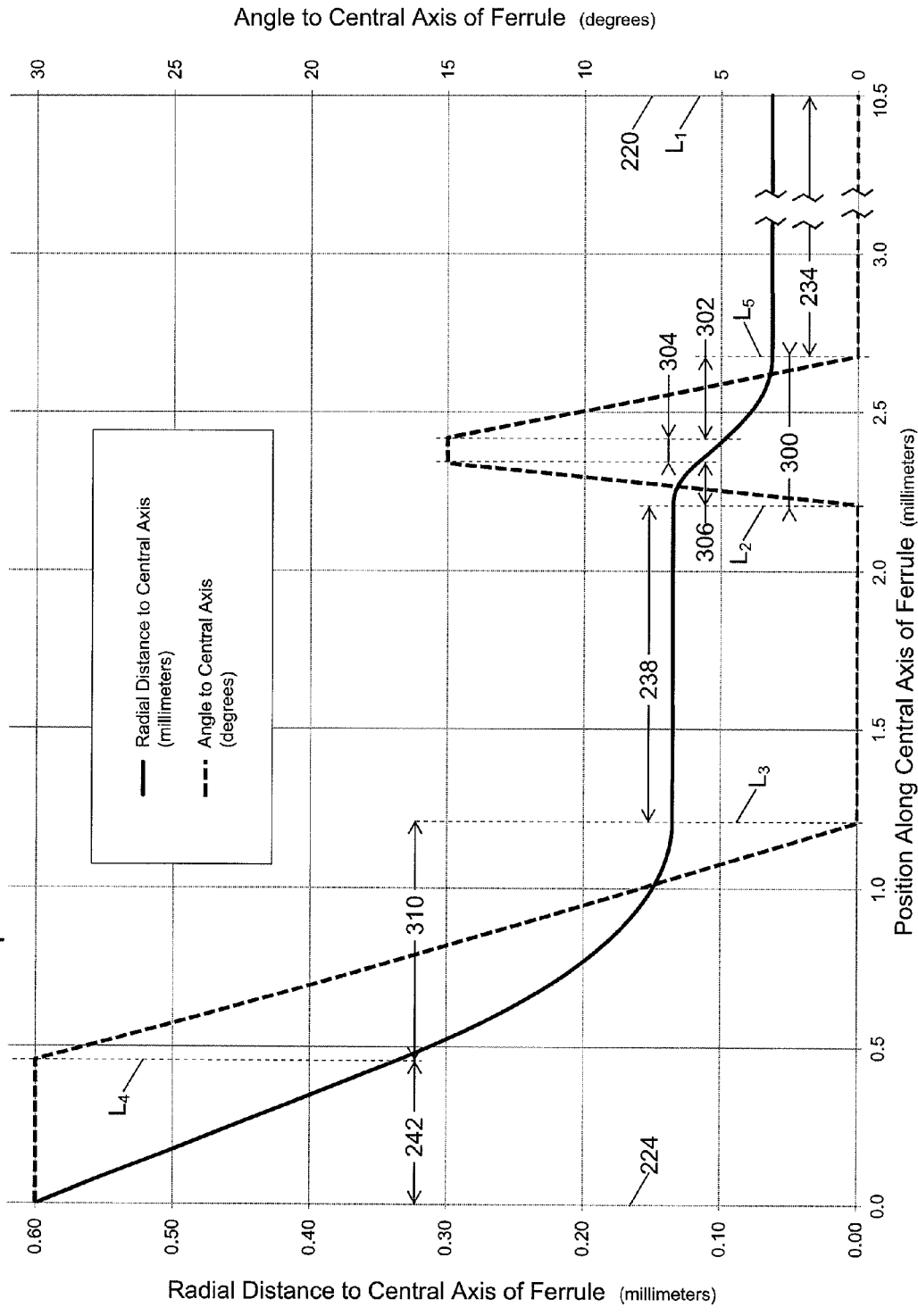
FIG. 21 Radius and Slope of Smooth Internal Contour of Ferrule vs. Position

CABLE AND DUAL INNER DIAMETER FERRULE DEVICE WITH SMOOTH INTERNAL CONTOURS AND METHOD

CROSS REFERENCE TO RELATED APPLICATIONS

This application is a continuation of application Ser. No. 13/648,580, filed Oct. 10, 2012, now U.S. Pat. No. 8,989,541, issued Mar. 24, 2015, which application claims the benefit of U.S. Provisional Patent Application Ser. No. 61/545,444, filed Oct. 10, 2011, entitled DUAL INNER DIAMETER FERRULE DEVICE WITH SMOOTH INTERNAL CONTOURS AND METHOD, which applications are hereby incorporated by reference in their entirety. This application is related to application Ser. No. 13/114,721, filed May 24, 2011, which is a continuation of application Ser. No. 12/271,335, filed Nov. 14, 2008, now abandoned, which is a continuation of application Ser. No. 11/972,373, filed Jan. 10, 2008, now U.S. Pat. No. 7,452,137, which is a continuation of application Ser. No. 11/497,175, filed Aug. 1, 2006, now U.S. Pat. No. 7,341,383, which applications are incorporated herein by reference in their entirety.

FIELD OF THE INVENTION

The present disclosure relates to terminating the ends of fiber optic cables with ferrules.

BACKGROUND OF THE INVENTION

Typically the end of a fiber optic cable is terminated by a fiber optic connector by gluing the fiber within the cable to a ferrule of the connector. A well known fiber optic cable size includes an inner glass fiber of 125 microns in diameter, with an outer coating of 250 microns in diameter, covered by a polymeric buffer layer of 900 microns in diameter.

One problem with terminating fiber optic cables can include fiber breakage at the rear interface area between the end of the glass fiber and the ferrule. In this interface area is the epoxy used to hold the fiber to the ferrule. Such breakage tends to increase in response to greater temperature fluctuations during use of the cables. Differences in thermal expansion are believed to cause the breakage. There is a need to improve the interface between fiber optic cables and connectors to reduce fiber breakage, especially due to thermal stress.

SUMMARY OF THE INVENTION

A fiber optic ferrule includes a body extending from a first end to a second opposite end, with the body including a smooth and continuous axial passage extending between the first and second ends. The smooth and continuous axial passage includes a first diameter portion having a diameter of at least 125 microns and a second diameter portion having a diameter of at least 250 microns. The second diameter portion is positioned between the first diameter and the second end. The smooth and continuous axial passage further defines a funnel shape at the second end extending inward from the second end to the second diameter portion. The smooth and continuous axial passage further defines a first transition between the first and the second diameter portions and a second transition between the second diameter portion and the funnel shape.

A method of assembling a terminated fiber optic cable includes providing a cable with an inner fiber at 125 microns, an outer coating at 250 microns, and a buffer layer at 900 microns. The method includes stripping a portion of the coating from an end of the cable to expose a portion of the inner fiber, and stripping a portion of the buffer layer to expose a portion of the coating. The method further includes inserting the exposed fiber and the exposed coating into a smooth and continuous axial passage of a ferrule having first and second inner diameters, wherein the first diameter is at least 125 microns, and the second diameter is at least 250 microns, and adhesively holding the fiber to the ferrule.

The present disclosure also relates to a device and method for mounting a fiber to a ferrule wherein the ferrule includes a first passageway portion sized only to receive a bare fiber without a coating or a buffer layer, a second passageway portion sized to receive the fiber including the coating, but no buffer layer, and a smooth and continuous transition between the first and the second passageway portions.

BRIEF DESCRIPTION OF THE DRAWINGS

FIG. 1 is a cross-sectional side view of one embodiment of a ferrule and a hub in accordance with the principles of the present disclosure;

FIG. 2 is an end view of the ferrule and hub of FIG. 1;

FIG. 9 is a distal end view of an embodiment of a fiber optic connector including another embodiment of a ferrule and a hub in accordance with the principles of the present disclosure;

FIG. 10 is a cross-sectional side view of the fiber optic connector of FIG. 9, as called out at FIG. 9;

FIG. 11 is an enlarged portion of FIG. 10;

FIG. 13 is a distal end view of the ferrule of FIG. 9;

FIG. 14 is a distal end view of still another embodiment of a ferrule in accordance with the principles of the present disclosure;

FIG. 15 is a partial side view of the ferrules of FIG. 9 and FIG. 14;

FIG. 16 is a cross-sectional side view of the ferrule of FIG. 9, as called out at FIG. 13;

FIG. 17 is a cross-sectional side view of the ferrule of FIG. 14, as called out at FIG. 14;

FIG. 21 is a graph of a radius and a slope of the inner passage of FIG. 19.

DETAILED DESCRIPTION OF THE PREFERRED EMBODIMENT

Figure 3:
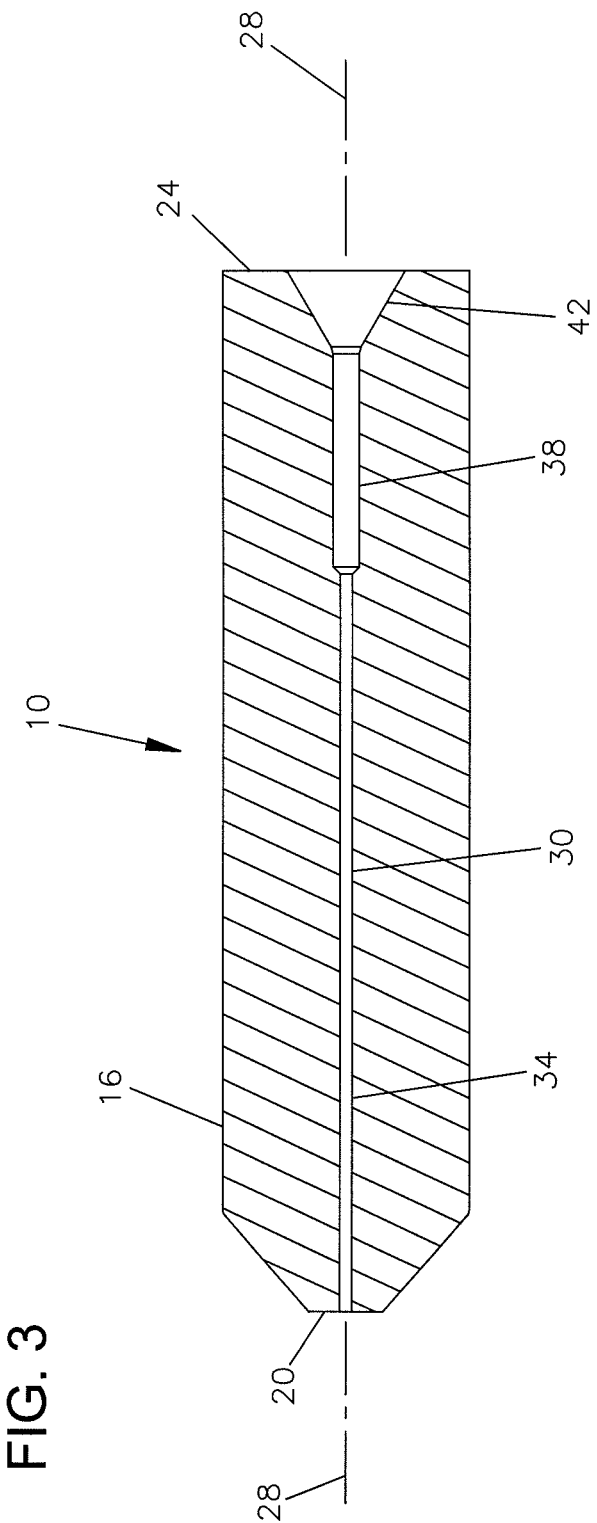
FIG. 3 is a cross-sectional side view of the ferrule of FIG. 1.

Referring now to FIGS. 1-7, a preferred embodiment of a fiber optic ferrule 10 is shown mounted to a hub 12. Generally, ferrule 10 and hub 12 are secured together by convenient methods including press fit or adhesive mounts. Ferrule 10 and hub 12 are mounted within a connector housing 13 shown in dashed lines in FIG. 1. Connector housing 13 can be one of a variety of well known connector types, including SC, FC, ST, LX.5, LC, and others. As will be described below, ferrule 10 and hub 12 are connected to an end of a fiber optic cable for use in connectorizing the end of the cable.

Ferrule 10 includes a body 16 with a first end 20 defining a ferrule tip. Body 16 of ferrule 10 includes an opposite end 24 received in a pocket 14 of hub 12. Ferrule 10 includes a central axis 28. First end 20 of ferrule 10 is typically polished along with the fiber after the fiber is installed. Body 16 of ferrule 10 is typically ceramic in construction.

Ferrule 10 includes a central passage 30 concentric with axis 28. Central passage 30 extends from first end 20 to opposite end 24. Central passage 30 includes a first portion 34 having a first diameter, an intermediate or second portion 38 having a second diameter, and a rear or third portion 42. First portion 34 is sized to receive the inner fiber sized at 125 microns. Second portion 38 is sized to receive the portion of the cable including the outer coating at 250 microns. Third portion 42 is tapered inward from opposite end 24 so as to facilitate insertion of the fiber during installation.

Figure 8:
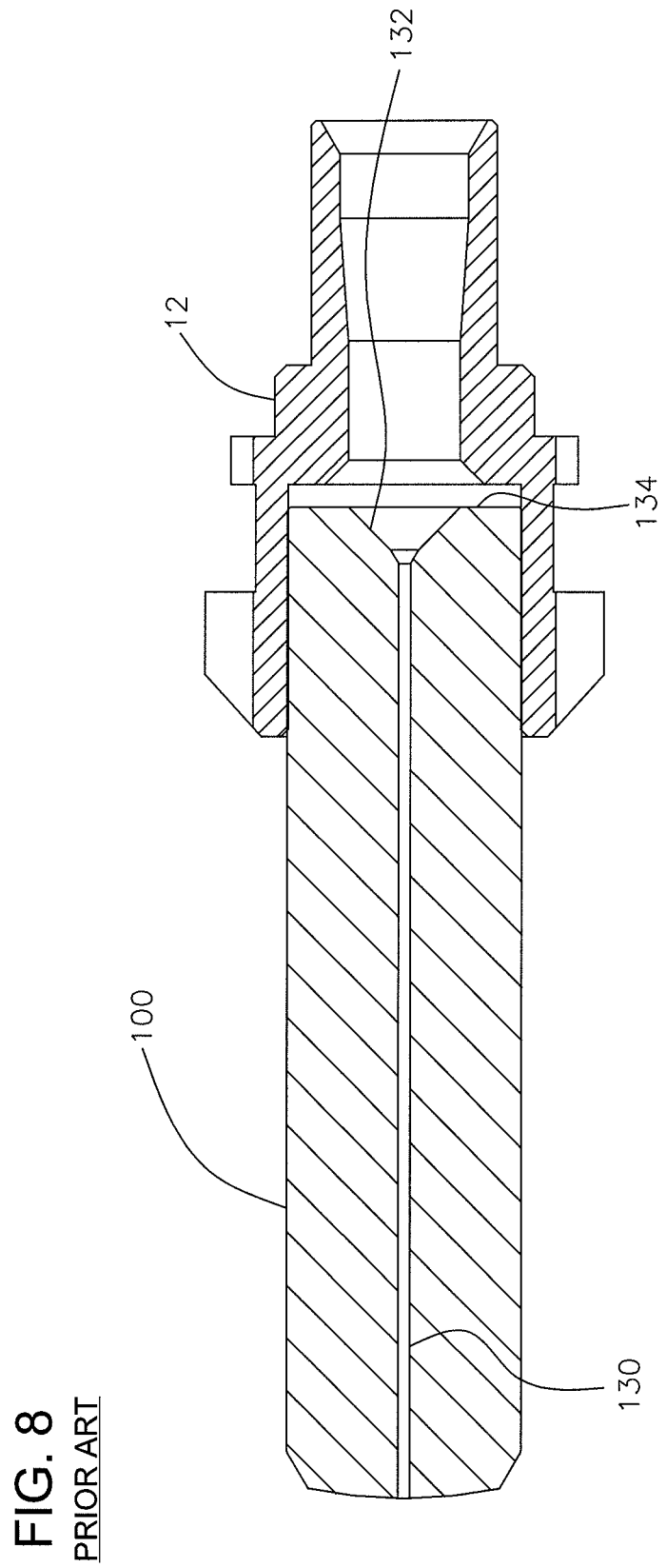
FIG. 8 is a cross-sectional side view of a prior art ferrule and hub.

In prior art ferrules, such as ferrule 100 shown in FIG. 8, dual diameters were not provided. In particular, the ferrule 100 of FIG. 8 includes a central passage 130 having a uniform diameter sized for receipt of the inner fiber at 125 microns. A tapered portion 132 extends from end 134 to central passage 130.

In contrast, ferrule 10 includes dual diameter portions 34, 38, each specially sized to receive the inner fiber (125 microns) and a portion of the outer coating (250 microns), respectively.

Figure 4:
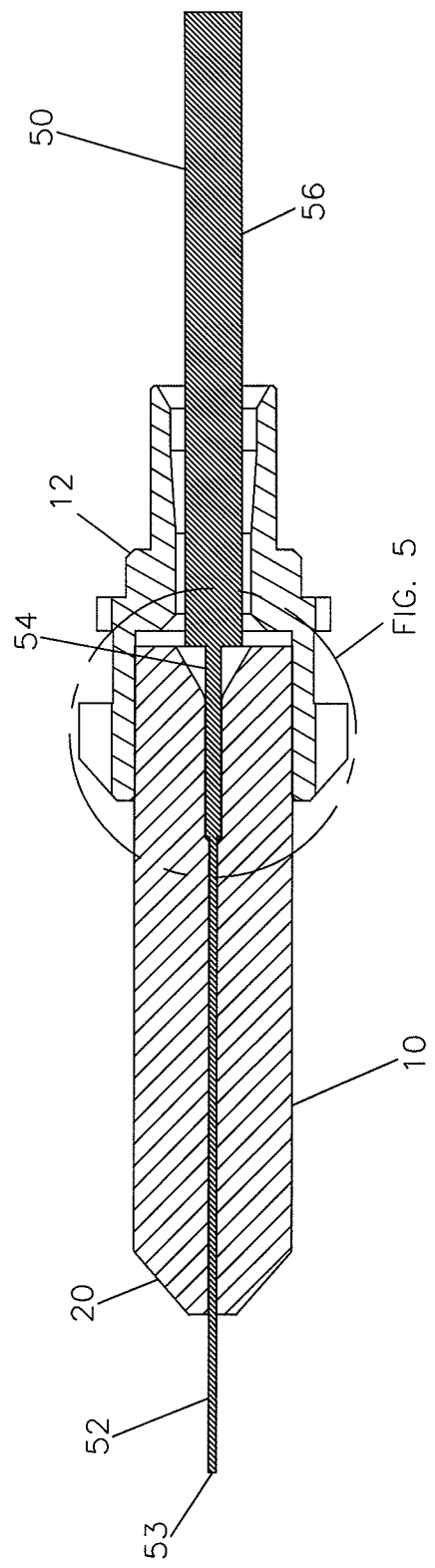
FIG. 4 is a cross-sectional side view of the ferrule and hub of FIG. 1 and includes a fiber optic cable inserted into the inner passage through the ferrule.
Figure 5:
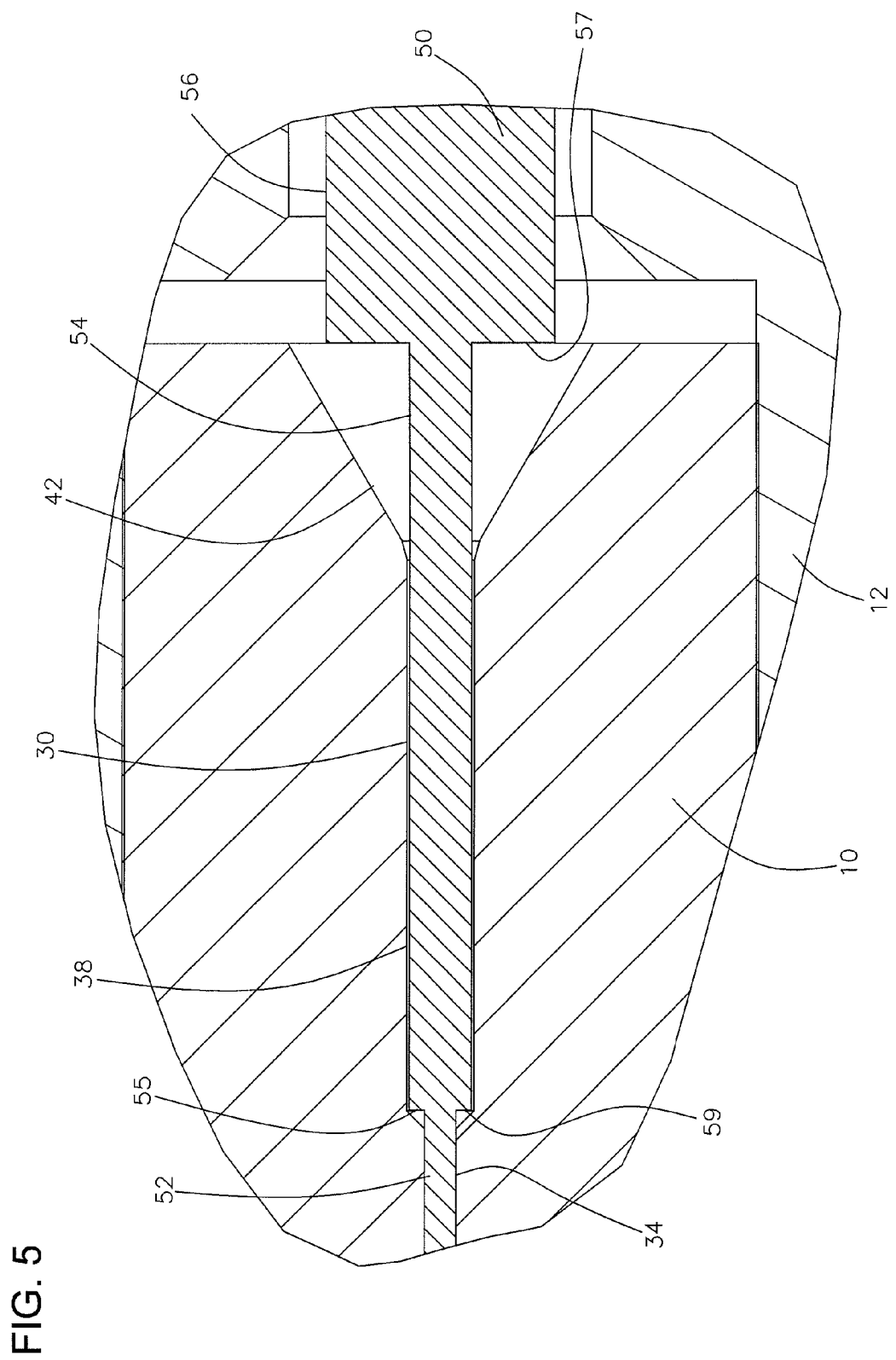
FIG. 5 is an enlarged cross-sectional view of a portion of the ferrule, hub, and cable of FIG. 4.

Referring now to FIGS. 4 and 5, a fiber optic cable 50 is shown with an inner fiber 52, an outer coating 54, and a buffer layer 56. Fiber 52 terminates at end 53. Typically, end 53 is removed and polished with end 20 of ferrule 10. Coating 54 terminates at end 55. Buffer layer 56 terminates at end 57. As shown, a portion of coating 54 extends beyond end 57 of buffer layer 56.

With special reference to FIG. 5, ferrule 10 closely surrounds fiber 52, and coating 54. Epoxy is used within central passage 30 to adhesively hold cable 50 to ferrule 10. However, very little epoxy is positioned around end 55 of coating 54. By reducing the volume of epoxy positioned around end 55 of coating 54, less thermally induced stresses are applied to fiber 52. As shown, passage 30 defines a small conically shaped pocket 59 around end 55 of coating 54. Pocket 59 is the transition area between first and second portions 34, 38 of central passage 30. By allowing coating 54 to extend past end 57 of buffer layer 56, and then be received in pocket 59, a smaller amount of epoxy is in contact with fiber 52 adjacent end 55 of coating 54. Less epoxy around the interface between coating 54 and fiber 52 will reduce the thermal effects caused by any differences in thermal expansion between fiber 52 and the epoxy.

Figure 6:
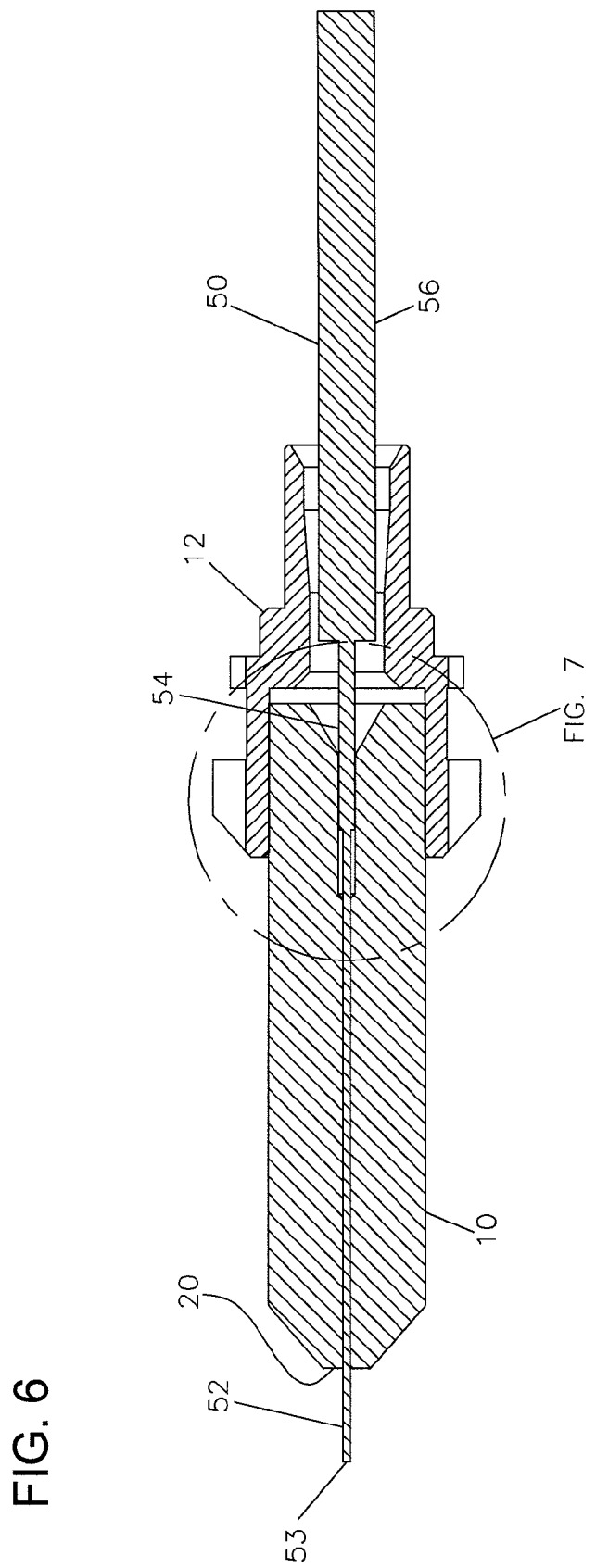
FIG. 6 is a cross-sectional side view of the ferrule and hub of FIG. 1 and includes a fiber optic cable inserted into the inner passage through the ferrule with a fiber coating layer not as fully inserted into the ferrule.
Figure 7:
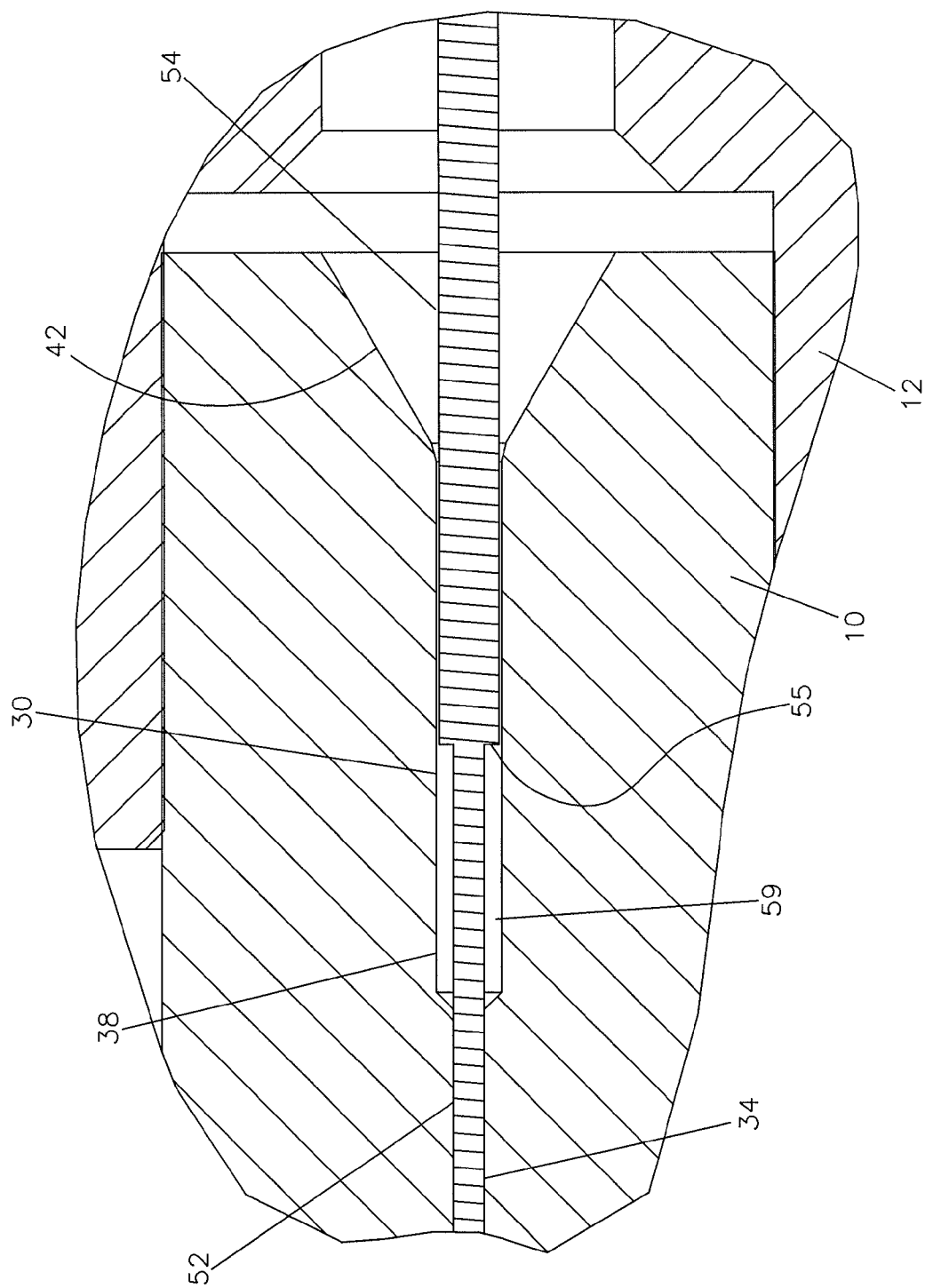
FIG. 7 is an enlarged cross-sectional view of a portion of the ferrule, hub, and cable of FIG. 6.

Coating 54 does not need to be fully inserted into ferrule 10, as shown in FIGS. 4 and 5. As shown in FIGS. 6 and 7, pocket 59 is larger around the end 55 of coating 54. Such an arrangement still provides less epoxy around fiber 52, than in the arrangement of FIG. 8. One example epoxy is F123 from Tra-con, Inc. of Bedford, Mass.

In ferrule 10, first portion 34 has a first dimension sized large enough to receive the uncoated fiber, but not so large as to receive the coated fiber. Second portion 38 has a second dimension large enough to receive the coated fiber, but not so large as to receive the buffer.

In the illustrated embodiment, first portion 34 is cylindrically shaped and sized at 0.1255 mm+/−0.0015/.0000 mm to receive the inner fiber sized at 125 microns. Second portion 38 is cylindrically shaped and sized at 0.260 mm+/−0.010 mm to receive the portion of the cable including the outer coating at 250 microns. A preferred range for second portion 38 is greater than 250 microns, and less than or equal to 500 microns. A more preferred range for second portion 38 is greater than 250 microns, and less than or equal to 300 microns. In the illustrated embodiment, ferrule 10 is 10.5 mm long, with second portion 38 extending into ferrule 10 about 3 mm from end 24.

Referring now to FIGS. 9-13, 15, 16, and 18-21, a preferred embodiment of a fiber optic connector 200, including a fiber optic ferrule 210, is shown. The fiber optic ferrule 210 is mounted to a hub 212 of the fiber optic connector 200 (see FIGS. 10-12). In other preferred embodiments, a fiber optic ferrule 210', illustrated at FIGS. 14, 15, and 17-21, can be mounted to the hub 212 of the fiber optic connector 200. Hereinafter, unless noted otherwise, the fiber optic ferrule 210 and the fiber optic ferrule 210' will be collectively referred to as the fiber optic ferrule 210.

Generally, the fiber optic ferrule 210 and the hub 212 are secured together by convenient methods including press fit or adhesive mounts. In certain preferred embodiments, the hub 212 is a plastic material that is overmolded onto the ferrule 210. The fiber optic ferrule 210 and the hub 212 are mounted within a connector housing 213, shown at FIGS. 9-12. In the depicted embodiment, the connector housing 213 is an SC type connector housing, and the fiber optic connector 200 is an SC type fiber optic connector. In other embodiments, the fiber optic connector 200 can be one of a variety of well-known connector types, including FC, ST, LX.5, LC, and others. As described above, with respect to the ferrule 10 and the hub 12, the ferrule 210 and the hub 212 are connected to the end of the fiber optic cable 50 for use in connectorizing the end of the fiber optic cable 50.

Figure 12:
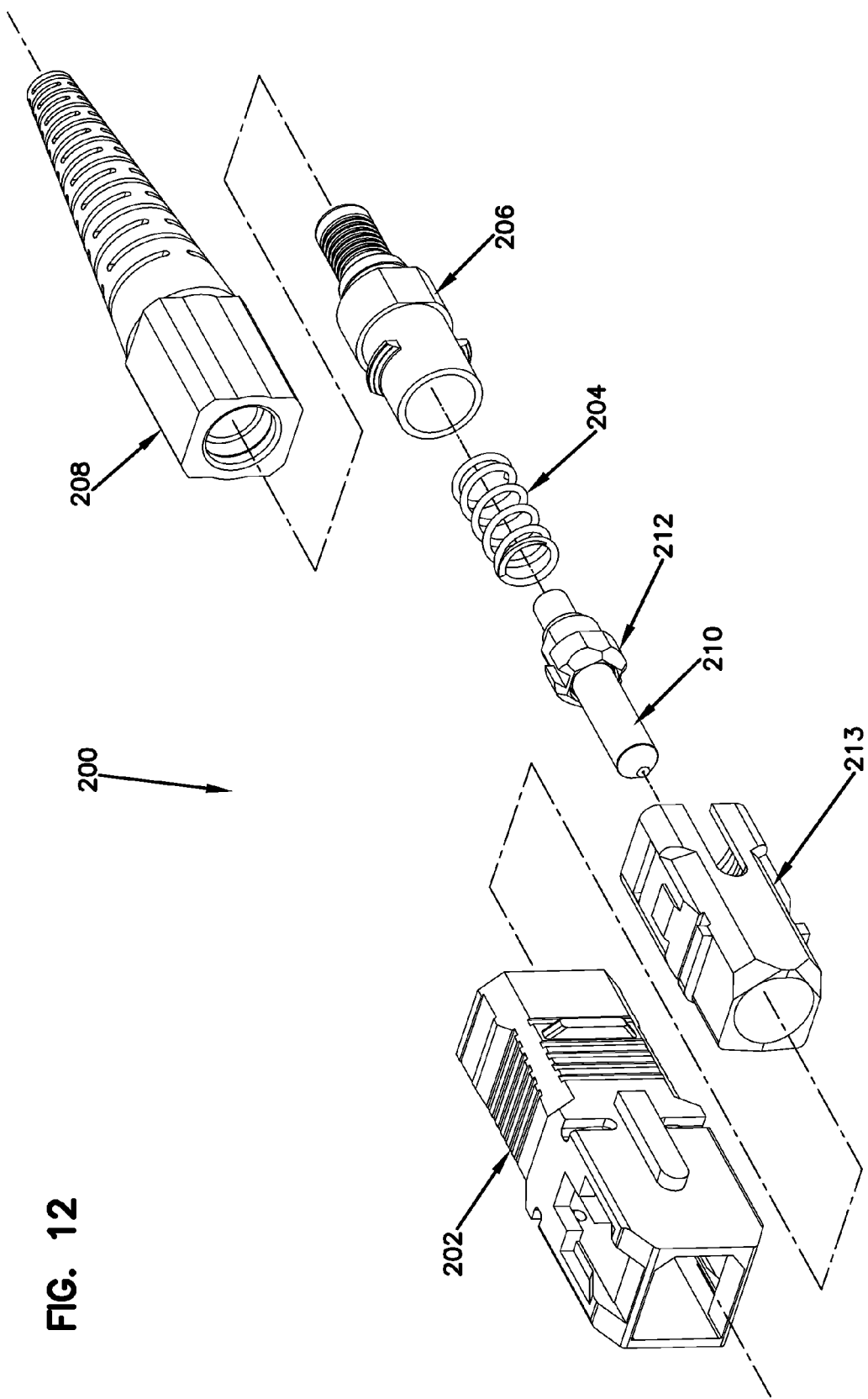
FIG. 12 is an exploded perspective view of the fiber optic connector of FIG. 9.

As illustrated at FIGS. 10-12, the fiber optic connector 200 may further include a release sleeve 202, a spring 204, a proximal member 206, and/or a cable strain relief member 208. As illustrated at FIGS. 16 and 17, the ferrule 210 includes a body 216 with a first end 220 defining a ferrule tip. The body 216 of the ferrule 210 includes an opposite end 224 received in a pocket 214 of the hub 212 (see FIG. 11). The ferrule 210 includes a central axis 228. The first end 220 of the ferrule 210 is typically polished along with the fiber 52 after the fiber 52 is installed. The body 216 of the ferrule 210 is typically ceramic in construction.

In certain preferred embodiments, the body 216 of the ferrule 210 is made of yttria-stabilized zirconium-oxide, yttria-stabilized zirconia, YSZ, $Y_2O_3$ stabilized $ZrO_2$, etc. In certain preferred embodiments, the body 216 of the ferrule 210 is molded. By molding the ferrule 210, internal features can be included within the ferrule 210. The internal features can be smooth and continuous and include curvature. The smooth and continuous internal features can be produced at a lower cost than by alternative methods, such as machining. In certain preferred embodiments, the body 216 of the ferrule 210 has a crystal structure that is 100% tetragonal. In certain preferred embodiments, the body 216 of the ferrule 210 has a maximum average grain size of about 0.5 microns. In certain preferred embodiments, the body 216 of the ferrule 210 has a hardness (HV10) of about 1100-1600. In certain preferred embodiments, the body 216 of the ferrule 210 has a Young's modulus of about 30,000,000 pounds per square inch. In certain preferred embodiments, the body 216 of the ferrule 210 has a flexural strength of about 1,000,000,000 Pascals. In certain preferred embodiments, the body 216 of the ferrule 210 has a density of about 6 grams per cubic centimeter. In certain preferred embodiments, the body 216 of the ferrule 210 has a coefficient of linear thermal expansion of about $10.6 \times 10^{-6}$/degrees Celsius between 40 degrees Celsius and 40 degrees Celsius and a coefficient of linear thermal expansion of about $11.0 \times 10^{-6}$/degrees Celsius between 400 degrees Celsius and 800 degrees Celsius.

The ferrule 210 includes a central passage 230 concentric with the axis 228. The central passage 230 extends from the first end 220 to the opposite end 224. The central passage 230 includes a first portion 234 having a first diameter $D_1$ (see FIGS. 16 and 17), an intermediate or second portion 238 having a second diameter $D_2$ (see FIG. 18), and a rear or third portion 242. In certain preferred embodiments, the central passage 230 is molded into the body 216 of the ferrule 210. In other embodiments, the central passage 230 is machined into the body 216 of the ferrule 210.

Figure 18:
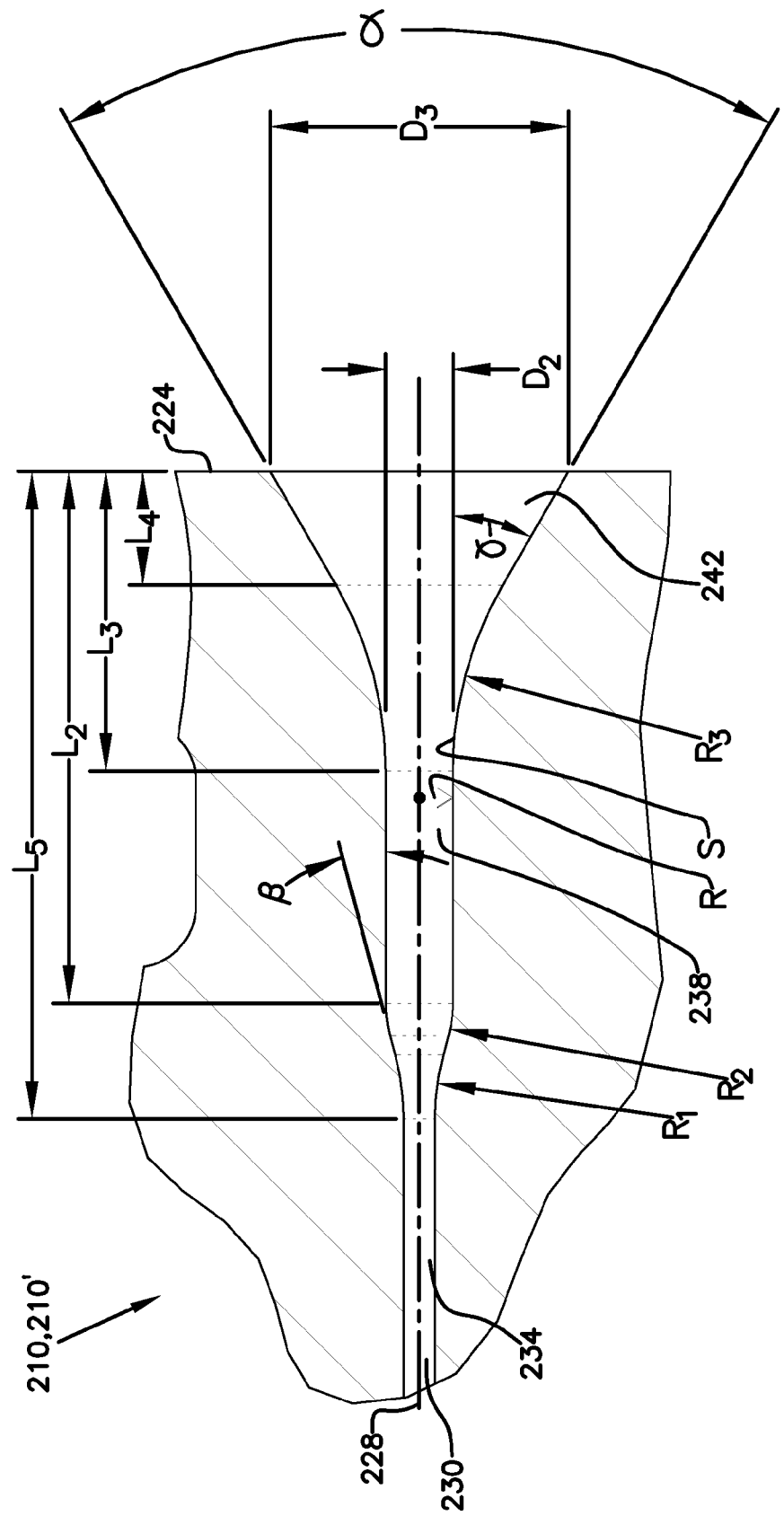
FIG. 18 is a partial cross-sectional side view of the ferrules of FIG. 9 and FIG. 14, as called out at FIGS. 13 and 14, respectively.
Figure 19:
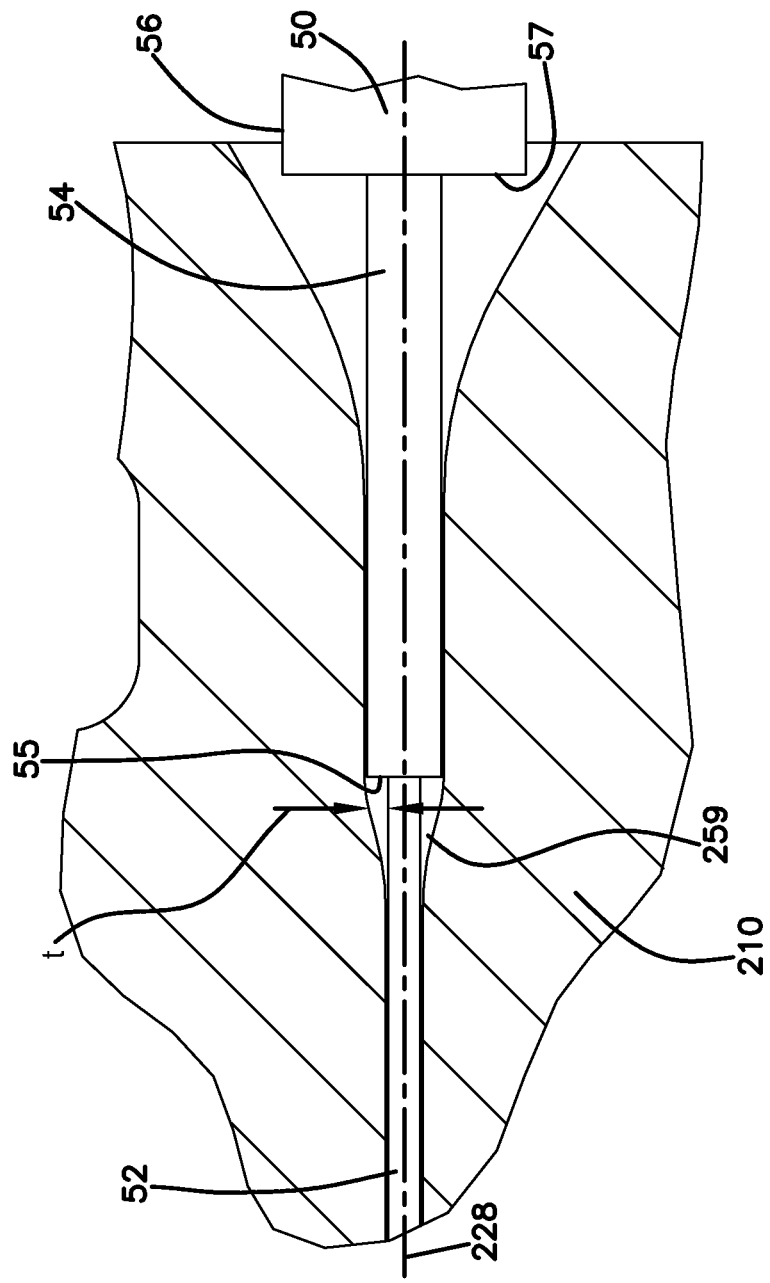
FIG. 19 is the partial cross-sectional side view of FIG. 18, but with the fiber optic cable of FIG. 4 overlaid and inserted into an inner passage of the ferrule of FIG. 9 or 14.
Figure 20:
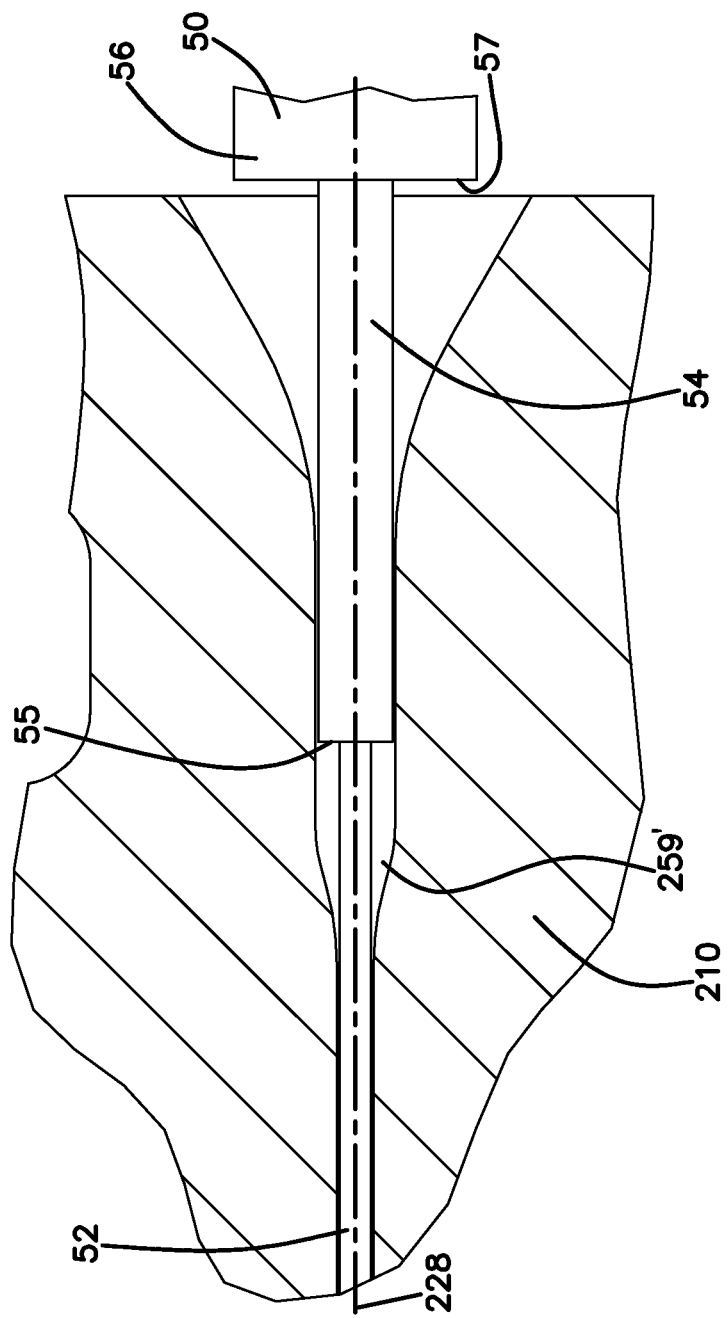
FIG. 20 is the partial cross-sectional side view of FIG. 18, but with the fiber optic cable of FIG. 4 overlaid and inserted into the inner passage of FIG. 19 with the fiber coating layer of FIG. 6 not as fully inserted into the ferrule of FIG. 9 or 14.

As with the first portion 34 mentioned above, the first portion 234 is sized to receive the inner fiber 52, sized at 125 microns, (see FIGS. 19 and 20). As with the second portion 38 mentioned above, the second portion 238 is sized to receive the portion of the fiber optic cable 50 including the outer coating 54 at 250 microns. As with the third portion 42 mentioned above, the third portion 242 is tapered inwardly from the opposite end 224 so as to facilitate insertion of the fiber 52 during installation. By having the smooth and continuous central passage 230, scratching and scoring of the inner fiber 52 and the outer coating 54 can be eliminated or substantially reduced. The scratching and scoring of the inner fiber 52 and/or the outer coating 54 can produce defects that can grow into fatigue cracks and lead to failure of the fiber 52. In a preferred embodiment, the third portion 242 is sized at a third diameter $D_3$ (see FIG. 18) of about 1.2 millimeters+/−0.1 millimeter and forms an angle α of about 60 degrees+/−3 degrees centered about the central axis 228. In other embodiments, the third diameter $D_3$ may range from about 0.5 millimeter to about 1.5 millimeters. In other embodiments, the angle α may range from about 60 degrees+/−30 degrees. In other embodiments, the angle α may range from about 60 degrees+/−15 degrees.

In contrast with certain prior art ferrules 100 (see FIG. 8), the ferrule 210 includes dual diameter portions 234, 238, each specially sized to receive the inner fiber 52 (125 microns) and a portion of the outer coating 54 (250 microns), respectively.

As illustrated at FIGS. 4, 5, 19, and 20, the fiber optic cable 50 includes the inner fiber 52, the outer coating 54, and the buffer layer 56. The inner fiber 52 terminates at the end 53. Typically, the end 53 is removed and polished with the end 220 of the ferrule 210. The coating 54 terminates at the end 55. The buffer layer 56 terminates at the end 57. As shown, a portion of the coating 54 extends beyond the end 57 of the buffer layer 56. In certain preferred embodiments, the inner fiber 52 is made of silica and has a Young's modulus of about 70.3 GPa (10,000,000 pounds per square inch $10^6$). In certain preferred embodiments, the inner fiber 52 has a coefficient of thermal expansion of about $5 \times 10^{-7}$/degrees Celsius. In certain preferred embodiments, the coating 54 includes an inner coating that has a Young's modulus of about 1-5 MPa and an outer coating that has a Young's modulus of about 800 MPa.

With special reference to FIG. 19, ferrule 210 closely surrounds the fiber 52, and the coating 54. Epoxy is used within the central passage 230 to adhesively hold the cable 50 to the ferrule 210. However, a limited amount of the epoxy is positioned around the end 55 of the coating 54, and is shaped by the central passage 230 of the ferrule 210. As will be described in detail below, by prescribing a shape of the epoxy and/or by reducing the volume of the epoxy positioned around the end 55 of the coating 54, less thermally induced stresses, including fatiguing cyclical stresses, are applied to the fiber 52. As shown, the passage 230 defines a small pocket 259 around the end 55 of the coating 54. The pocket 259 is a transition area between the first and the second portions 234, 238 of the central passage 230 and is smoothly shaped by the central passage 230. By allowing the coating 54 to extend past the end 57 of the buffer layer 56, and then be received in the pocket 59, a limited amount of the epoxy is in contact with the fiber 52 adjacent the end 55 of the coating 54. Limited epoxy around the interface between the coating 54 and the fiber 52 will reduce the thermal effects caused by any differences in thermal expansion between the fiber 52, the ferrule 210, and the epoxy.

The coating 54 does not need to be fully inserted into the ferrule 210, as shown at FIG. 19. As shown at FIG. 20, a pocket 259' further includes a portion of the second portion 238 and therefore is larger around the end 55 of the coating 54. Such an arrangement still provides less of the epoxy around the fiber 52, than in the arrangement of FIG. 8.

One example epoxy is F123 from Henkel of Düsseldorf, Germany. Another example epoxy is EPO-TEK® 383ND from Epoxy Technology, Inc. of Billerica, Mass. 01821. The epoxy, when cured, has a coefficient of thermal expansion of about $34 \times 10^{-6}$/degrees Celsius below a glass transition temperature of about 100 degrees Celsius and a coefficient of thermal expansion of about $129 \times 10^{-6}$/degrees Celsius above the glass transition temperature. The epoxy has a storage modulus of about 369,039 pounds per square inch.

In the ferrule 210, the first portion 234 has a first dimension sized large enough to receive the uncoated fiber 52, but not so large as to receive the coated fiber. The second portion 38 has a second dimension large enough to receive the coated fiber, but not so large as to receive the buffer layer 56.

In the illustrated embodiment, the first portion 234 is cylindrically shaped, and the first diameter $D_1$ is sized at 0.1255 millimeter+/−0.0010/0.0000 millimeter to receive the inner fiber 52, sized at about 125 microns. The second portion 238 is cylindrically shaped, and the second diameter $D_2$ is sized at 0.27 millimeter+/−0.02 millimeter/0.00 millimeter to receive the portion of the cable 50 including the outer coating 54 at about 250 microns. A preferred range for the second diameter $D_2$ of the second portion 238 is greater than 245 microns and less than or equal to 500 microns. A more preferred range for the second diameter $D_2$ of the second portion 238 is greater than 260 microns and less than or equal to 400 microns. An even more preferred range for the second diameter $D_2$ of the second portion 238 is greater than 260 microns and less than or equal to 300 microns.

In the illustrated embodiment, a length $L_1$ (see FIGS. 16 and 17) of the ferrule 210 is about 10.5 millimeters+/−0.05 millimeters long, with the second portion 238 extending into the ferrule 210 by a length $L_2$ (see FIG. 18) of about 2.21 millimeters+/−0.1 millimeters from the end 224. In other embodiments, the length $L_2$ may range from about 5 millimeters to about 1 millimeter. In the illustrated embodiment, the second portion 238 starts at a length $L_3$ (see FIG. 18) of about 1.21 millimeters+/−0.1 millimeters from the end 224. In other embodiments, the length $L_3$ may range from about 4 millimeters to about 0.5 millimeter. In the illustrated embodiment, the third portion 242 extends between the end 224 and a length $L_4$ (see FIG. 18) of about 0.4573 millimeters+/−0.1 millimeters from the end 224. In other embodiments, the length $L_4$ may range from about 2 millimeters to about 0.2 millimeter. In the illustrated embodiment, the first portion 234 extends between the end 220 and a length $L_5$ (see FIG. 18) of about 2.6771 millimeters+/−0.1 millimeters from the end 224. In other embodiments, the length $L_5$ may range from about 5.5 millimeters to about 0.7 millimeter.

According to the principles of the present disclosure, the central passage 230 of the fiber optic ferrule 210 is smooth and continuous. FIG. 21 includes a graph of a radius R from the central axis 228 to an interior surface S (see FIG. 18) of the central passage 230 as the central passage 230 extends along the length $L_1$ from the end 224 to the end 220. The radius R is smooth and continuous along the length $L_1$ from the end 224 to the end 220. FIG. 21 also includes a graph of a slope γ from the central axis 228 to the interior surface S (see FIG. 18) of the central passage 230 as the central passage 230 extends along the length $L_1$ from the end 224 to the end 220. The slope γ is continuous along the length $L_1$ from the end 224 to the end 220. By having the smooth and continuous radius R and the continuous slope γ, stress concentrations imposed on the fiber 52 can be substantially reduced. In particular, the epoxy bonds the fiber 52 to the central passage 230 of the fiber optic ferrule 210 and may impose the stress concentrations on the fiber 52. By having the smooth and continuous radius R and the continuous slope γ, stress concentrations imposed on the outer coating 54 can be substantially reduced. In particular, the epoxy bonds the outer coating 54 to the central passage 230 of the fiber optic ferrule 210 and may impose the stress concentrations on the outer coating 54 and thereby to the fiber 52 which is mechanically joined to the outer coating 54. The stress concentrations can be generated by thermal stress from differential thermal expansion between the fiber 52, the epoxy, and/or the fiber optic ferrule 210. The stress concentrations can also be generated by mechanical loads including shock and vibration. The stress concentrations can also be generated by shrinkage or expansion of the epoxy as it cures. The stress concentrations can also be generated by changes in a radial thickness t of the epoxy (see FIG. 19). In particular, the radial thickness t of the epoxy is very small in the first portion 234 of the central passage 230. The small radial thickness t of the epoxy may result in a relatively high radial stiffness of the epoxy in the first portion 234 of the central passage 230 compared with a lower radial stiffness of the epoxy in the pocket 259. By having the smooth and continuous radius R and the continuous slope γ, thickness change of the radial thickness t of the epoxy also changes smoothly from the first portion 234 of the central passage 230 and into the pocket 259. By having the smooth and continuous radius R and the continuous slope γ, stiffness change of the radial stiffness of the epoxy also changes smoothly from the first portion 234 of the central passage 230 into the pocket 259. The smooth stiffness change of the radial stiffness of the epoxy may also substantially reduce the stress concentration.

To provide the smooth and continuous central passage 230 of the fiber optic ferrule 210, a first transition 300 is included between the first portion 234 and the second portion 238, and a second transition 310 is included between the second portion 238 and the third portion 242 (see FIGS. 18 and 21). The first transition 300 includes a first segment 302 that includes a first radius $R_1$ depicted at about 1 millimeter. In other embodiments, the first radius $R_1$ can range from about 0.2 millimeter to about 1.5 millimeters. The first transition 300 includes a second segment 304 that is linear and is sloped relative to the central axis 228 by an angle β. As depicted, the angle β is 15 degrees. In other embodiments, the angle β can range from about 5 degrees to about 20 degrees or from about 5 degrees to about 45 degrees. The first transition 300 includes a third segment 306 that includes a second radius $R_2$ depicted at about 0.5 millimeter. In other embodiments, the second radius $R_2$ can range from about 0.2 millimeter to about 1.5 millimeters. The second transition 310 includes a third radius $R_3$ depicted at about 1.5 millimeters. In other embodiments, the third radius $R_3$ can range from about 0.2 millimeter to about 4.5 millimeters.

In certain embodiments, the transition 300 is provided, and the second transition 310 may be deleted. In these embodiments, the central passage 230 may not be completely smooth and continuous along the length $L_1$. The transition 300 facilitates smoothing out differences in thermal expansion and stiffness between the fiber optic ferrule 210, the inner fiber 52, and the epoxy. The transition 300 thereby protects the inner fiber 52 by reducing stress concentrations. In certain embodiments, the outer coating 54, where present, may accommodate differences in thermal expansion and stiffness between the fiber optic ferrule 210, the inner fiber 52, and the epoxy and may thereby offer some protection from stress concentrations.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic ferrule adapted to terminate an optical fiber including a coating with an end positioned within the fiber optic ferrule, the fiber optic ferrule comprising:
   a ferrule body extending from a first end to an opposite second end, the ferrule body including a smooth and continuous axial passage extending between the first and the second ends of the ferrule body, the smooth and continuous axial passage of the ferrule body including a smooth and continuous transition area extending between a first portion and a second portion of the smooth and continuous axial passage; and
   a hub mounted around the second end of the ferrule body, the hub including an axial passage;
   wherein the first portion of the smooth and continuous axial passage of the ferrule body is adapted to receive a bare portion of the optical fiber without the coating;
   wherein the second portion of the smooth and continuous axial passage of the ferrule body is adapted to receive a coated portion of the optical fiber with the coating; and
   wherein the smooth and continuous transition area is adapted to define a pocket that limits an amount of an adhesive material in contact with the optical fiber adjacent the end of the coating and thereby reduce one or more stress concentrations imposed on the optical fiber.

2. The fiber optic ferrule of claim 1, wherein the first portion of the smooth and continuous axial passage extends to the first end of the ferrule body.

3. The fiber optic ferrule of claim 1, wherein the second portion of the smooth and continuous axial passage extends to the second end of the ferrule body.

4. The fiber optic ferrule of claim 3, wherein the first portion of the smooth and continuous axial passage extends to the first end of the ferrule body.

5. The fiber optic ferrule of claim 1, wherein the one or more stress concentrations that the fiber optic ferrule is adapted to reduce includes at least one of thermal stresses, fatiguing cyclical stresses, shock stresses, vibration stresses, mechanical load stresses, stresses induced by shrinkage of the adhesive material, stresses induced by expansion of the adhesive material, stresses induced by changes in a radial thickness of the adhesive material, and/or stresses induced by changes in a radial stiffness of the adhesive material.

6. The fiber optic ferrule of claim 1, wherein the axial passage of the hub is adapted to receive an end of a buffer layer that is positioned around the coating.

7. The fiber optic ferrule of claim 1, wherein the smooth and continuous axial passage of the ferrule body is concentric with a central axis of the fiber optic ferrule.

8. The fiber optic ferrule of claim 7, wherein the smooth and continuous axial passage of the ferrule body includes an interior surface, wherein a radius is defined between the central axis and the interior surface, and wherein the radius varies smoothly and continuously along a length of the ferrule body along the smooth and continuous transition area.

9. The fiber optic ferrule of claim 8, wherein a slope of the interior surface is continuous along the length of the ferrule body along the smooth and continuous transition area.

10. The fiber optic ferrule of claim 7, wherein the smooth and continuous axial passage of the ferrule body includes an interior surface, wherein a radius is defined between the central axis and the interior surface, and wherein the radius varies smoothly and continuously along a length of the ferrule body from the first end of the ferrule body to the second end of the ferrule body.

11. The fiber optic ferrule of claim 10, wherein a slope of the interior surface is continuous along the length of the ferrule body from the first end of the ferrule body to the second end of the ferrule body.

12. The fiber optic ferrule of claim 1, wherein the smooth and continuous transition area includes a first fillet adjacent the first portion and a second fillet adjacent the second portion.

13. The fiber optic ferrule of claim 12, wherein the smooth and continuous transition area includes a sloping surface adjacent the first and the second fillets.

14. The fiber optic ferrule of claim 1, wherein the ferrule body is molded of a ceramic material.

15. The fiber optic ferrule of claim 1, wherein the first portion of the smooth and continuous axial passage of the ferrule body has a diameter of about 125 microns.

16. A method of reducing stress concentration imposed on an optical fiber terminated by a fiber optic ferrule, the optical fiber including a coating with an end positioned within the fiber optic ferrule, the method comprising:
    providing a cable with the optical fiber and the coating around the optical fiber, the optical fiber including a bare portion of the optical fiber without the coating and a coated portion of the optical fiber with the coating;
    providing the fiber optic ferrule, the fiber optic ferrule including a ferrule body extending from a first end to an opposite second end, the ferrule body including a smooth and continuous axial passage extending between the first and the second ends of the ferrule body, the smooth and continuous axial passage of the ferrule body including a smooth and continuous transition area extending between a first portion and a second portion of the smooth and continuous axial passage;
    applying an adhesive material for holding the optical fiber to the ferrule body;
    inserting the bare portion of the optical fiber and at least a portion of the coated portion of the optical fiber into the smooth and continuous axial passage of the ferrule body and thereby defining a pocket with the smooth and continuous transition area, wherein the first portion of the smooth and continuous axial passage only receives the bare portion and no coating and the second portion of the smooth and continuous axial passage receives at least a portion of the coated portion; and
    limiting an amount of the adhesive material in contact with the optical fiber adjacent the end of the coating with the pocket and thereby reducing the stress concentration imposed on the optical fiber.

17. The method of claim 16, wherein the fiber optic ferrule further includes a hub with an axial passage, wherein the hub is mounted around the second end of the ferrule body, wherein the cable further includes a buffer layer around a portion of the coating, and wherein an end of the buffer layer is positioned within the axial passage of the hub.

18. The method of claim 16, further comprising positioning the end of the coating of the optical fiber in the smooth and continuous transition area.

19. The method of claim 16, further comprising positioning the end of the coating of the optical fiber adjacent the smooth and continuous transition area.

20. The method of claim 16, further comprising spacing the end of the coating of the optical fiber from the smooth and continuous transition area.

* * * * *